(12) United States Patent
Carini et al.

(10) Patent No.: US 12,723,718 B2
(45) Date of Patent: Sep. 1, 2026

(54) STRUCTURAL HEALTH MONITORING OF CRYOGENIC FUEL TANKS

(71) Applicant: Simmonds Precision Products, Inc., Vergennes, VT (US)

(72) Inventors: Peter J. Carini, Underhill, VT (US); Yeasin Bhuiyan, Vergennes, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 435 days.

(21) Appl. No.: 18/199,679

(22) Filed: May 19, 2023

(65) Prior Publication Data

US 2025/0283580 A1 Sep. 11, 2025

(51) Int. Cl.

*F17C 13/02* (2006.01)
*B64D 37/30* (2006.01)
*B64D 45/00* (2006.01)

(52) U.S. Cl.

CPC .............. *F17C 13/02* (2013.01); *B64D 37/30* (2013.01); *B64D 2045/0085* (2013.01); *F17C 2221/012* (2013.01); *F17C 2270/0189* (2013.01)

(58) Field of Classification Search

CPC ................ F17C 13/02; F17C 2221/012; F17C 2270/0189; B64D 37/30; B64D 2045/0085
USPC .......................................................... 340/945
See application file for complete search history.

(56) References Cited

U.S. PATENT DOCUMENTS

2008/0256960 A1 10/2008 Greason et al.
2015/0276456 A1* 10/2015 Boyd ..................... G01F 23/14 73/114.54
2018/0288080 A1* 10/2018 Keller ................. H04L 63/1425
2020/0363804 A1* 11/2020 Meyers ............... G01M 5/0091
2022/0316656 A1 10/2022 Burks

FOREIGN PATENT DOCUMENTS

CN 111272886 A 6/2020
CN 113176332 B 11/2022
CN 115264381 A 11/2022
CN 115790720 A 3/2023
EP 4141402 A1 3/2023
WO 2020094221 A1 5/2020

OTHER PUBLICATIONS

Extended European Search Report dated Oct. 15, 2024, for corresponding European Patent Application No. 24176662.5, 7 pgs.

* cited by examiner

*Primary Examiner* — Kerri L Mcnally
(74) *Attorney, Agent, or Firm* — Tucker Ellis LLP

(57) ABSTRACT

A method of health monitoring aircraft fuel system structures can include monitoring guided waves emitted by at least one guided wave emitter mounted to an inner hydrogen tank using at least one guided wave detector mounted to the inner hydrogen tank to monitor for a change versus a first baseline. The method can include monitoring guided waves emitted by at least one guided wave emitter mounted to an outer hydrogen tank surrounding the inner hydrogen tank using at least one guided wave detector mounted to the outer tank to monitor for a change versus a second baseline. The method includes outputting an alert to at least one of aircraft avionics and/or an onboard integrated Vehicle Health Management system (IVHM) if a change versus either or both of the first or second baselines is detected.

20 Claims, 1 Drawing Sheet

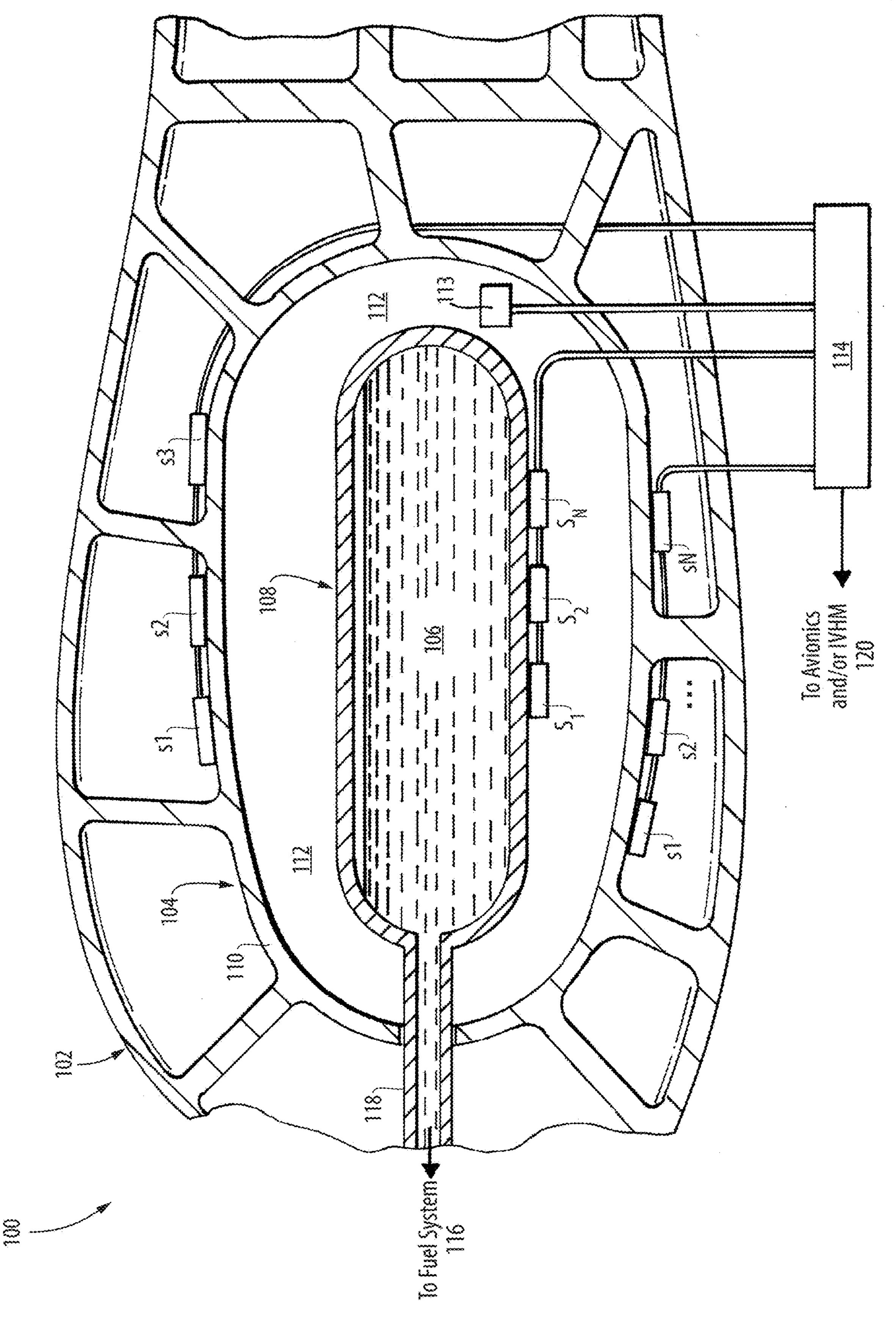
100
102
104
106
108
110
112
112
113
114
s1
s2
s3
s1
s2
sN
$S_1$
$S_2$
$S_N$
118
To Fuel System
116
To Avionics
and/or IVHM
120

STRUCTURAL HEALTH MONITORING OF CRYOGENIC FUEL TANKS

BACKGROUND

1. Field

The present disclosure relates to structural health monitoring, and more particularly to structural health monitoring for hydrogen fuel tanks such as aboard aircraft.

2. Description of Related Art

With the increasing impetus towards clean aviation fuels such as liquid hydrogen to reduce global carbon emissions, there comes a need to rethink traditional aircraft subsystem design and monitoring approaches in cryogenic environments, specifically for the fuel tank design and monitoring. Traditional tanks and fuel systems designed for safe-life implementation are not exposed to the much harsher environment of cryogenic temperatures which can cause hydrogen embrittlement. In addition to cryogenic temperatures, hydrogen fuel also poses greater challenges due to the pressurization required for liquification (assurance of function, enhanced structural integrity, etc.), as well as the higher potential for gaseous leaks (due to the smaller relative molecular size of $H_2$) which could result in premature ignition and collateral damage.

The conventional techniques have been considered satisfactory for their intended purpose. However, there is an ever present need for improved systems and methods for structural health monitoring for hydrogen fuel tanks and systems such as aboard aircraft to ensure structural integrity of the tank and safety of the fuel system through the duration of its service lifespan. This disclosure provides a solution for this need.

SUMMARY

A fuel system for an aircraft includes a cryogenic storage system for hydrogen fuel having an inner tank configured for direct contact with cryogenic hydrogen therein, and an outer tank surrounding the inner tank. The outer tank is spaced apart from the inner tank by an insulation gap. A first guided wave sensor array is mounted to an outer surface of the inner tank and/or a second guided wave sensor array is mounted to a surface of the outer tank.

A controller can be operatively connected to the first guided wave sensor array and to the second guided wave sensor array to control the first and second guided wave sensor arrays for structural health monitoring of the inner and outer tanks. The first guided wave sensor array can include at least one guided wave emitter, and at least one guided wave detector spaced apart from one another on the outer surface of the inner tank. The controller can include logic configured to cause the controller to monitor guided waves emitted by the at least one guided wave emitter using the at least one guided wave detector to monitor for a change versus a baseline, and to output an alert if a change versus the baseline is detected. The second guided wave sensor array can include at least one guided wave emitter, and at least one guided wave detector spaced apart from one another on the outer surface of the outer tank. The controller can include logic configured to cause the controller to monitor guided waves emitted by the at least one guided wave emitter using the at least one guided wave detector to monitor for a change versus a baseline, and to output an alert if a change versus the baseline is detected.

The outer tank can be mounted as a load bearing structure of an aircraft. The inner tank can include liquid hydrogen fuel and/or cryo-compressed hydrogen fuel connected in fluid communication to an aircraft propulsion system through a fuel port communicating through the insulation gap. The insulation gap can be evacuated relative to ambient pressure. The insulation gap can be an insulative vacuum with respect to heat transfer between the inner tank and an ambient environment external to the outer tank.

A method of health monitoring in aircraft fuel system structures includes monitoring guided waves emitted by at least one guided wave emitter mounted to an inner hydrogen tank using at least one guided wave detector mounted to the inner hydrogen tank to monitor for a change versus a first baseline. The method includes monitoring guided waves emitted by at least one guided wave emitter mounted to an outer hydrogen tank surrounding the inner hydrogen tank using at least one guided wave detector mounted to the outer tank to monitor for a change versus a second baseline. The method includes outputting an alert to at least one of aircraft avionics and/or an onboard Integrated Vehicle Health Management system (IVHM) if a change versus either or both of the first or second baselines is detected.

The monitoring of the inner tank can be performed with liquid hydrogen and/or cryo-compressed hydrogen housed in the inner tank. The method can include powering the aircraft using the liquid hydrogen fuel while monitoring the inner and outer tanks. Monitoring the outer tank can be performed while bearing aircraft loads with the outer tank as a load bearing member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an embodiment of a system constructed in accordance with the present disclosure, showing the guided wave sensor arrays of the inner and outer hydrogen fuel tanks.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a fuel system for an aircraft in accordance with the disclosure is shown in FIG. 1 and is designated generally by reference character 100. The systems and methods described herein can be used to monitor health of hydrogen fuel tanks even at cryogenic temperatures, both for the safety of the fuel system including the structural integrity of the inner tank, as well as for structural health monitoring of the outer tank to ensure load path integrity (e.g., primary or secondary load paths) for aircraft.

The fuel system 100 for an aircraft structure 102 includes a cryogenic storage system 104 for hydrogen fuel 106 having an inner tank 108, e.g. a composite tank, configured for direct contact with cryogenic hydrogen fuel 106 therein. The cryogenic storage system 104 includes an outer tank 110 surrounding the inner tank 108. The outer tank 110, e.g. a metal or composite tank, is spaced apart from the inner tank by an insulation gap 112 (e.g., vacuum). A first guided wave sensor array, including any suitable number of sensors S1, S2, . . . . SN, is mounted to an outer surface of the inner tank 108. A second guided wave sensor array, including any suitable number of sensors s1, s2, s3, s4, s5, . . . sN, is mounted to a surface of the outer tank 110, which is shown as the outer surface, but could also be the inner surface or embedded in the tank wall. While FIG. 1 illustrates an outer tank integrated with an aircraft structure, it is also contemplated that the outer tank (and hence entire tank structure) could be removed and replaceable within the aircraft structure.

A controller 114 is connected to the first guided wave sensor array ($S_1$-$S_N$) and to the second guided wave sensor array (s1-sN) to control the first and second guided wave sensor arrays for structural health monitoring of the inner and outer tanks 108, 110. The first guided wave sensor array includes at least one guided wave emitter, and at least one guided wave detector spaced apart from one another on the outer surface of the inner tank 108, i.e. at least one of $S_1$-$S_N$ is an emitter and at least one is a detector. The controller 114 includes logic configured to cause the controller 114 to monitor guided waves emitted by the at least one guided wave emitter using the at least one guided wave detector to monitor for a change versus a baseline. The controller outputs an alert if a change versus the baseline is detected, which is indicative of a change in the structure of the inner tank 108 that should be annunciated by a health indicator or damage index, actioned such as by flight readiness or requiring subsequent inspection, and if necessary, repair or replacement of the inner tank 108. The second guided wave sensor array (s1-sN) includes at least one guided wave emitter, and at least one guided wave detector spaced apart from one another on the outer surface of the outer tank, i.e., at least one of s1-sN is an emitter and at least one is a detector. The controller 114 includes logic configured to cause the controller 114 to monitor guided waves emitted by the at least one guided wave emitter using the at least one guided wave detector to monitor for a change versus a baseline. If a change versus the baseline is detected that is indicative of a change in the structure of the outer tank 110 that should be actioned such as by inspection, and if necessary, repair or replacement of the outer tank 110, the controller 114 outputs an alert. The controller 114 connects to provide status including the alert to avionics and/or the IVHM (integrated vehicle health management) system 120.

The outer tank 110 is mounted as a load bearing structure of an aircraft 102, e.g. in FIG. 1 the outer tank is shown as a load bearing element in the wing or body of the aircraft 102. The inner tank 108 includes liquid and/or cryo-compressed hydrogen fuel 106 connected in fluid communication to an aircraft fuel system 116, and in turn the propulsion system through a fuel port 118 communicating through the insulation gap 112. The insulation gap 112 can be filled with thermal insulation including but not limited to multilayer insulation (MLI), and/or can be evacuated relative to ambient pressure, e.g. so the gap 112 is an insulative vacuum with respect to heat transfer between the inner tank 108 and an ambient environment external to the outer tank 110.

A method of health monitoring aircraft fuel system structures includes monitoring guided waves emitted by at least one guided wave emitter, e.g. one or more of sensors $S_1$-$S_N$, mounted to an inner hydrogen tank 108 using at least one guided wave detector, e.g. one or more of sensors $S_1$-$S_N$, mounted to the inner hydrogen tank 108 to monitor for a change versus a first baseline, and doing the same for the outer tank 110, e.g. using sensors s1-sN, either separately or in conjunction therewith. The method includes outputting an alert 120 to at least one of aircraft avionics such as a Flight Control Computer (FCC) and/or an onboard Integrated Vehicle Health Management (IVHM) system if a change versus either or both of the first or second baselines is detected.

The monitoring of the inner tank 108 is performed with liquid hydrogen and/or cryo-compressed hydrogen fuel 106 housed in the inner tank 108, i.e. while the inside of the tank 108 is at cryogenic temperatures. The method includes powering the aircraft using the liquid hydrogen fuel 106 while monitoring the inner and/or outer tanks 108, 110. A hydrogen gas leak detector 113 may be installed in the insulation gap 112, operatively connected to the controller 114 to augment system integrity checks. Monitoring the outer tank 110 may be performed while bearing aircraft loads with the outer tank as a load bearing member (e.g., a dynamic state), or while on the ground for a static state assessment. Monitoring both of the tanks 108, 110 can use piezo-electric actuators for ultrasonic guided wave structural sonar to detect the presence of damage or changes relative to a characterized baseline of the fuel tank structure.

Above, each of the inner and outer tanks 108, 110 has its own array of guided wave sensors. These can be used to serve two different purposes; they could be used independently or in conjunction. Monitoring the inner tank 108 for changes can be most desirable for ascertaining integrity of the fuel system. Another implementation option is to monitor the outer tank 110 wall, since it will most likely be used as primary aircraft structure; using it in conjunction with $H_2$ leak detection in the gap 112. Various combinations of these methods are also contemplated depending on the needs of the specific aircraft implementation.

Systems and methods as disclosed herein provide potential benefits including the following. In-situ ultrasonic guided wave systems can interrogate structure for aerospace structural integrity applications. While fuel tank structural monitoring is not necessarily needed with conventional fuels, use of liquid hydrogen as a fuel poses unique obstacles for safe-life operation of the fuel tank and subsystem. Amongst these challenges are cryogenic temperatures, aircraft cyclic fatigue, hydrogen embrittlement, intrinsic safety and the like, which can be monitored and accounted for using systems and methods as disclosed herein.

The methods and systems of the present disclosure, as described above and shown in the drawings, provide for monitoring health of hydrogen fuel tanks even at cryogenic temperatures, such as for structural health monitoring in aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel system for an aircraft comprising:

a cryogenic storage system for hydrogen fuel including an inner tank configured for direct contact with cryogenic hydrogen therein, and an outer tank surrounding the inner tank, wherein the outer tank is spaced apart from the inner tank by an insulation gap;

a first guided wave sensor array is mounted to an outer surface of the inner tank and a second guided wave sensor array is mounted to a surface of the outer tank; and a fuel port extends from the inner tank through the insulation gap and the outer tank, the fuel port configured to facilitate fluidic communication between an aircraft propulsion system and the inner tank.

2. The system as recited in claim 1, further comprising a controller operatively connected to the first guided wave sensor array and to the second guided wave sensor array to control the first and second guided wave sensor arrays for structural health monitoring of the inner and outer tanks.

3. The system as recited in claim 2, wherein the first guided wave sensor array includes at least one guided wave emitter, and at least one guided wave detector spaced apart from one another on the outer surface of the inner tank.

4. The system as recited in claim 3, wherein the controller includes logic configured to cause the controller to monitor guided waves emitted by the at least one guided wave emitter using the at least one guided wave detector to monitor for a change versus a baseline, and to output an alert if a change versus the baseline is detected.

5. The system as recited in claim 2, wherein the second guided wave sensor array includes at least one guided wave emitter, and at least one guided wave detector spaced apart from one another on the outer surface of the outer tank.

6. The system as recited in claim 5, wherein the controller includes logic configured to cause the controller to monitor guided waves emitted by the at least one guided wave emitter using the at least one guided wave detector to monitor for a change versus a baseline, and to output an alert if a change versus the baseline is detected.

7. The system as recited in claim 1, wherein the inner tank includes liquid hydrogen fuel connected in fluid communication to the aircraft propulsion system through the fuel port.

8. The system as recited in claim 1, wherein the inner tank includes cryo-compressed hydrogen fuel connected in fluid communication to the aircraft propulsion system through the fuel port.

9. The system as recited in claim 1, wherein the insulation gap is evacuated relative to ambient pressure.

10. The system as recited in claim 1, wherein the insulation gap is an insulative vacuum with respect to heat transfer between the inner tank and an ambient environment external to the outer tank.

11. A method of health monitoring aircraft fuel system structures comprising:

monitoring guided waves emitted by at least one guided wave emitter mounted to an inner hydrogen tank using at least one guided wave detector mounted to the inner hydrogen tank to monitor for a change versus a first baseline;

monitoring guided waves emitted by at least one guided wave emitter mounted to an outer hydrogen tank surrounding the inner hydrogen tank using at least one guided wave detector mounted to the outer tank to monitor for a change versus a second baseline; and outputting an alert to at least one of aircraft avionics and/or an onboard integrated vehicle health monitoring system (IVHM) if a change versus either or both of the first or second baselines is detected;

wherein the inner tank includes a fuel port extending through the inner tank and the outer tank that is configured to facilitate fluidic communication between an aircraft system and an interior of the inner tank.

12. The method as recited in claim 11, wherein the monitoring of the inner tank is performed with liquid hydrogen and/or cryo-compressed hydrogen housed in the inner tank.

13. The method as recited in claim 11, further comprising powering the aircraft using liquid hydrogen fuel from the inner tank while monitoring the inner and outer tanks.

14. The method as recited in claim 11, wherein monitoring the outer tank is performed while bearing aircraft loads with the outer tank as a load bearing member.

15. A fuel system for an aircraft comprising:

a cryogenic storage system for hydrogen fuel including an inner tank configured for direct contact with cryogenic hydrogen therein, and an outer tank surrounding the inner tank, wherein the outer tank is spaced apart from the inner tank by an insulation gap;

a guided wave sensor array mounted to a surface of the outer tank; and a fuel port extending through the insulation gap that is configured to facilitate fluidic communication between the inner tank and an aircraft propulsion system.

16. The system as recited in claim 15, wherein the guided wave sensor array includes at least one guided wave emitter, and at least one guided wave detector spaced apart from one another on the outer surf ace of the outer tank.

17. The system as recited in claim 16, wherein the controller includes logic configured to cause the controller to monitor guided waves emitted by the at least one guided wave emitter using the at least one guided wave detector to monitor for a change versus a baseline, and to output an alert if a change versus the baseline is detected.

18. The system as recited in claim 2, further comprising a hydrogen gas leak detector installed in the insulation gap and operatively connected to the controller to augment system integrity checks.

19. The system as recited in claim 1, wherein the second guided wave sensor array mounted to the surface of the outer tank includes a second guided wave sensor array mounted to a first side of the outer tank and another second guided wave sensor array mounted to a second side of the outer tank.

20. The system according to claim 15, further comprising another guided wave sensor array mounted to an outer surface of the inner tank.

* * * * *